(12) United States Patent
Scholin

(10) Patent No.: US 6,260,868 B1
(45) Date of Patent: Jul. 17, 2001

(54) STEERING ASSEMBLY

(76) Inventor: Craig J. Scholin, 201 Ley Ave., Marshfield, WI (US) 54449-0792

( * ) Notice: Subject to any disclaimer, the term of this patent is extended or adjusted under 35 U.S.C. 154(b) by 0 days.

(21) Appl. No.: 09/440,447

(22) Filed: Nov. 15, 1999

(51) Int. Cl.$^7$ ................................................. B62K 21/18
(52) U.S. Cl. ....................................... 280/270; 280/93.51
(58) Field of Search ................................... 280/263, 267, 280/270, 274, 234, 288.1, 92, 93.502, 93.51; 74/484 R, 469, 496, 504

(56) References Cited

U.S. PATENT DOCUMENTS

| | | | |
|---|---|---|---|
| 530,042 | * 11/1894 | Gillingham | ............................ 280/234 |
| 4,451,064 | 5/1984 | Perkins . | |
| 4,497,502 | 2/1985 | Forbes et al. . | |
| 4,541,647 | * 9/1985 | Braun | ..................... 280/234 |
| 4,586,723 | * 5/1986 | Nabinger | ............................ 280/250.1 |
| 4,674,762 | 6/1987 | Nelson et al. . | |
| 5,380,025 | * 1/1995 | Thorpe | ................... 280/270 |
| 5,503,244 | 4/1996 | Beirlein . | |
| 5,544,906 | 8/1996 | Clapper . | |
| 6,042,134 | * 3/2000 | Rector | ................................ 280/288.1 |

\* cited by examiner

Primary Examiner—J. J. Swann
Assistant Examiner—David R. Dunn
(74) Attorney, Agent, or Firm—Cook, Alex, McFarron, Manzo, Cummings & Mehler, Ltd.

(57) ABSTRACT

A steering assembly for use with a vehicle having a frame, with the frame being supported by at least one directional support (such as a rotatable wheel, ski, endless flexible track, etc.) that is pivotable about a first axis to steer the vehicle. The steering assembly comprises a first mounting member to which the directional support is secured, the mounting member being secured to the frame of the vehicle for pivotal motion about the first axis. A steering lever is mounted to the frame adjacent to the first mounting member, with the steering lever being pivotable about a second axis perpendicular to the first axis. The steering lever also has a drive pin associated therewith. A pivotable bearing block operatively connects the drive pin to the first mounting member. The bearing block includes a shaft that is received in the mounting block so as to permit rotation of the bearing block with respect to the mounting block about a third axis that is perpendicular to the first axis and is laterally displaced from the second axis. The bearing block includes first and second studs that project therefrom which capture the drive pin. Accordingly, when the steering lever pivots about the second axis, the bearing block pivots about the third axis and both the bearing block and the first mounting member pivot about the first axis, to rotate the directional support, thus effecting steering of the vehicle.

6 Claims, 4 Drawing Sheets

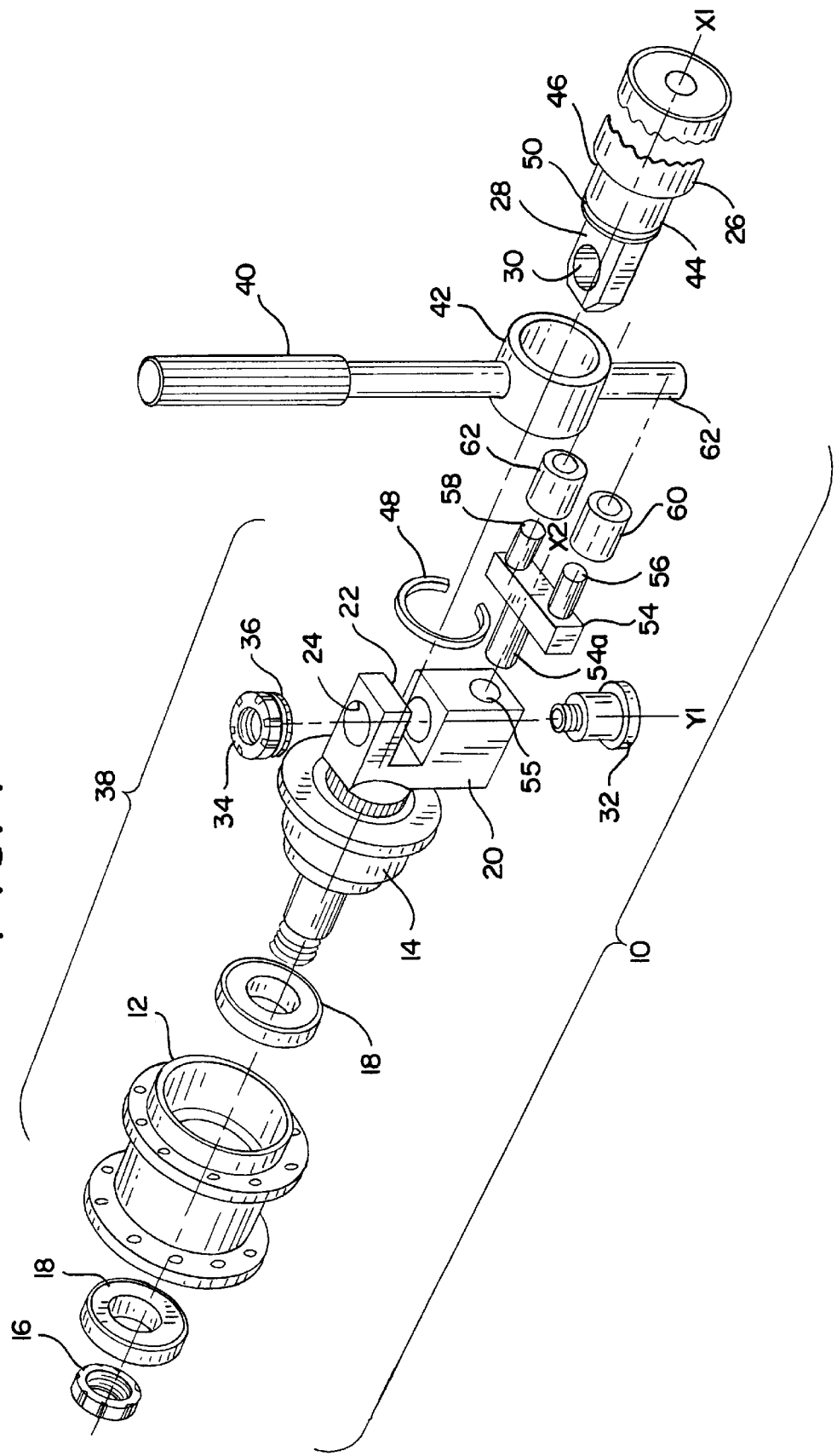

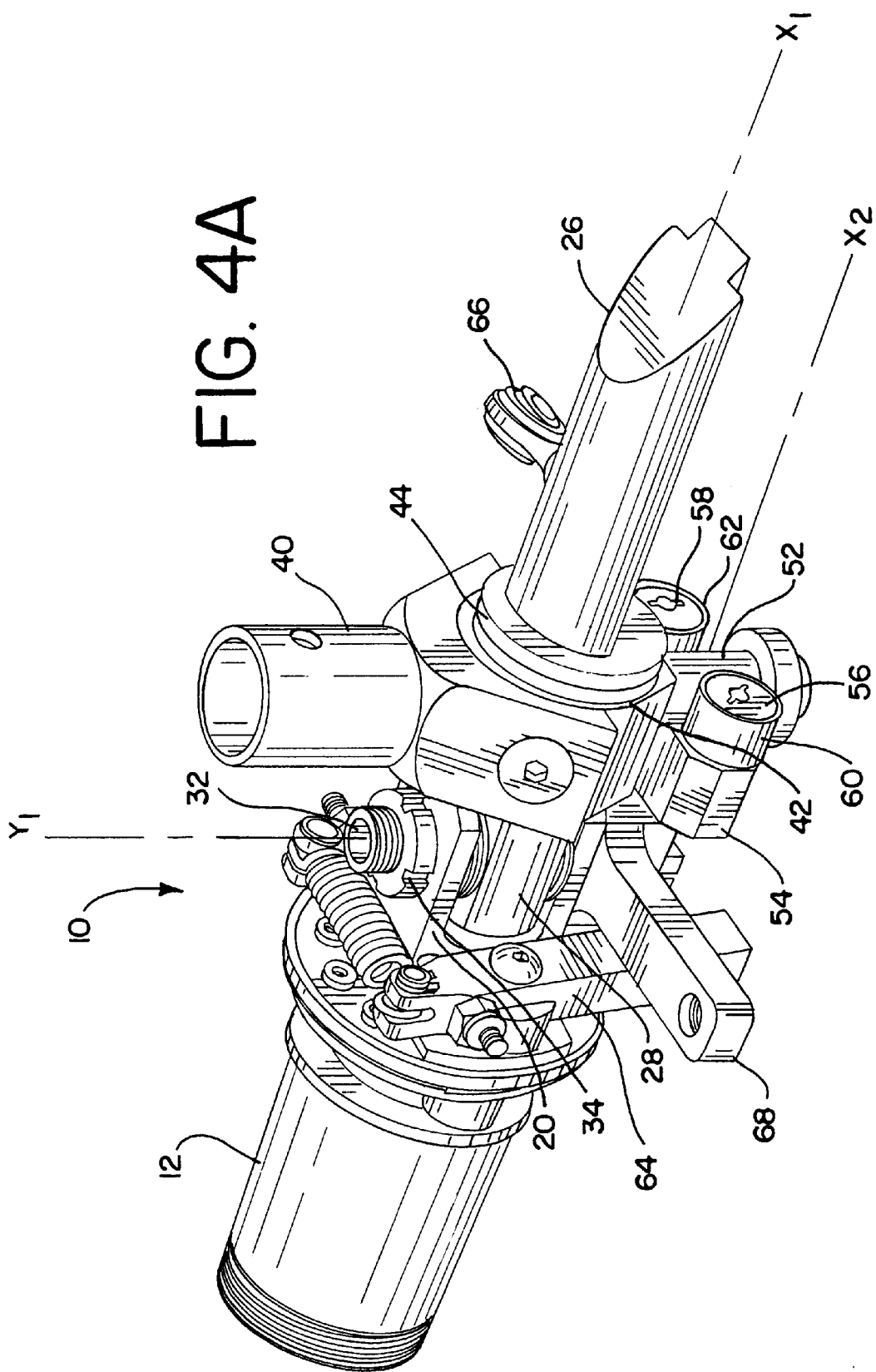

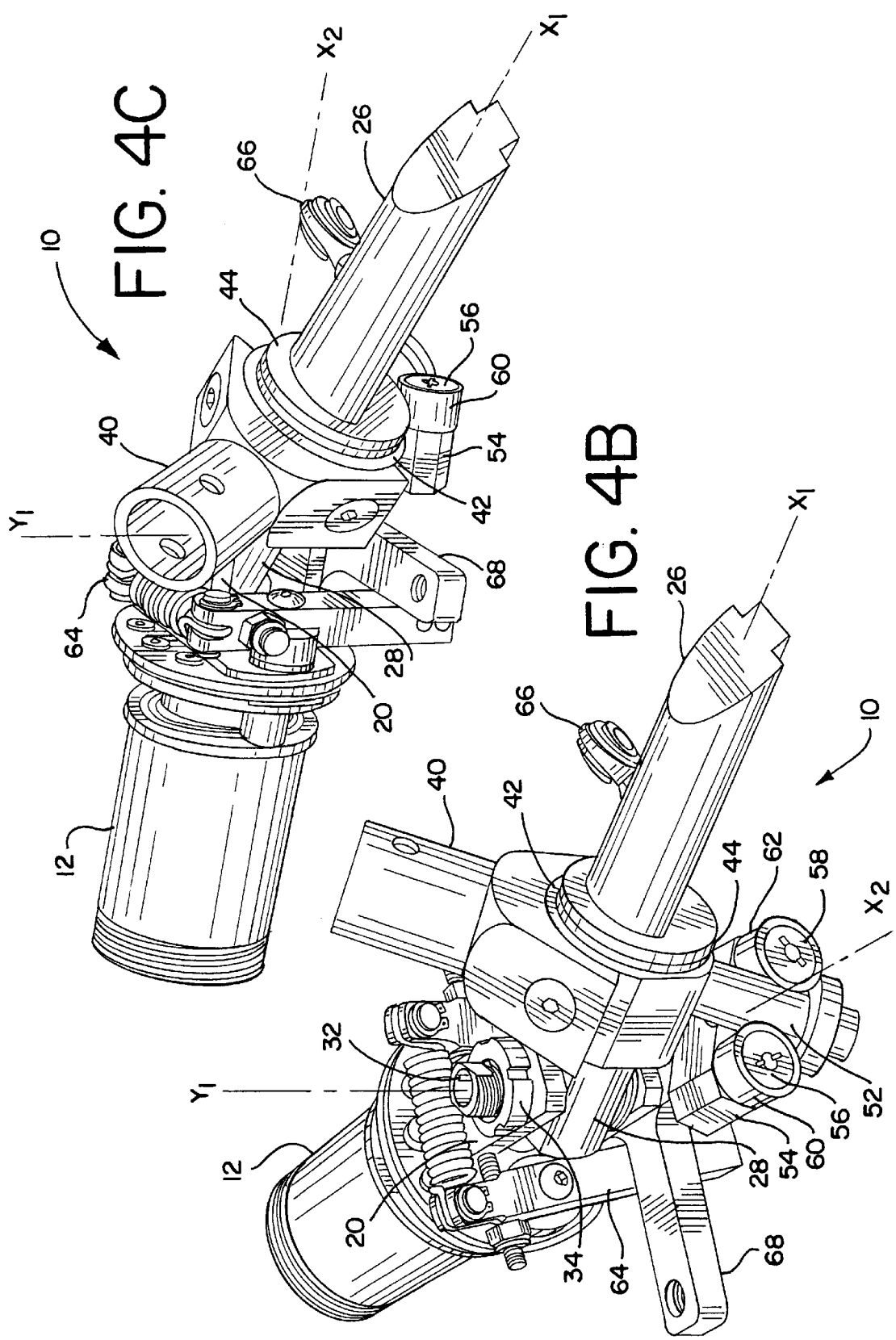

STEERING ASSEMBLY

The present invention relates to a steering mechanism and, more particularly, to a steering mechanism that has very little play or lost motion and a reduced sensitivity ratio between the steering control and the part steered when the mechanism is centered. The inventive steering mechanism may be advantageously used in, e.g., a human-powered recumbent vehicle.

BACKGROUND

Over the past few years, recumbent bicycles have been increasing in popularity with respect to conventional bicycles. Recumbent bicycles are more comfortable to ride than conventional bicycles because of the more natural seated position taken by the rider. This minimizes seat and neck soreness, aching shoulders, and numb hands that result from the small saddle and the rider's bent-over position used on a conventional bicycle. Recumbent bicycles also tend to be safer than conventional bicycles because of their lower center of gravity and the closer proximity of the rider to the ground. Recumbent bicycles are also able to stop more quickly because more of the rider's weight is over the rear wheels.

For these reasons, there is a greater availability of recumbent bicycles, as well as 3- and 4-wheeled recumbent vehicles. See, e.g., U.S. Pat. Nos. 4,451,064, 4,456,277, 4,497,502 and 5,544,903 (each disclosing recumbent tricycles) and U.S. Pat. No. 4,674,762 (disclosing a 4-wheeled recumbent quadracycle).

A variety of steering mechanisms have been used in conjunction with such 2-, 3- and 4-wheeled recumbent vehicles. Many of the steering mechanisms involve relatively complicated linkages and controls. Such mechanisms tend to have less than precise steering because of play and lost motion between the various components of the steering mechanism. Also, vehicles having such mechanisms are subject to over-steering as the rider moves the steering control away from the centered or straight-ahead steering direction.

Accordingly, it is an object of the present invention to provide a steering mechanism that has reduced play and lost motion between the components of the mechanism.

A further object is to provide a steering mechanism that has decreasing steering sensitivity when centered so as to minimize oversteering.

SUMMARY OF THE INVENTION

These objects, as well as others which will become apparent upon reference to the accompanying drawings and following detailed description, are provided by a steering assembly for use with a vehicle having a frame, with the frame being supported by at least one directional support (such as a rotatable wheel, ski, endless flexible track, etc.) that is pivotable about a first axis to steer the vehicle. The steering assembly comprises a first mounting member to which the directional support is secured, the mounting member being secured to the frame of the vehicle for pivotable motion about the first axis. A steering lever is mounted to the frame adjacent to the first mounting member, with the steering lever being pivotable about a second axis perpendicular to the first axis. The steering lever also has a drive pin associated therewith. A pivotable bearing block operatively connects the drive pin to the first mounting member. The bearing block includes a shaft that is received in the mounting block so as to permit rotation of the bearing block with respect to the mounting block about a third axis that is perpendicular to the first axis and is laterally displaced from the second axis. The bearing block includes first and second studs that project therefrom which capture the drive pin. Accordingly, when the steering lever pivots about the second axis, the bearing block pivots about the third axis, and both the bearing block and the first mounting member pivot about the first axis to rotate the directional support, thus effecting steering of the vehicle.

BRIEF DESCRIPTION OF THE DRAWINGS

FIG. 1 is an exploded perspective view of a steering assembly in accordance with the present invention adapted for use with a free-rotating wheel.

FIGS. 4A, 4B, and 4C are perspective views of a further embodiment of a steering assembly according to the present invention in the neutral or centered, right-hand turn, and left-hand turn positions.

DETAILED DESCRIPTION OF THE PREFERRED EMBODIMENT

Figure 2A:
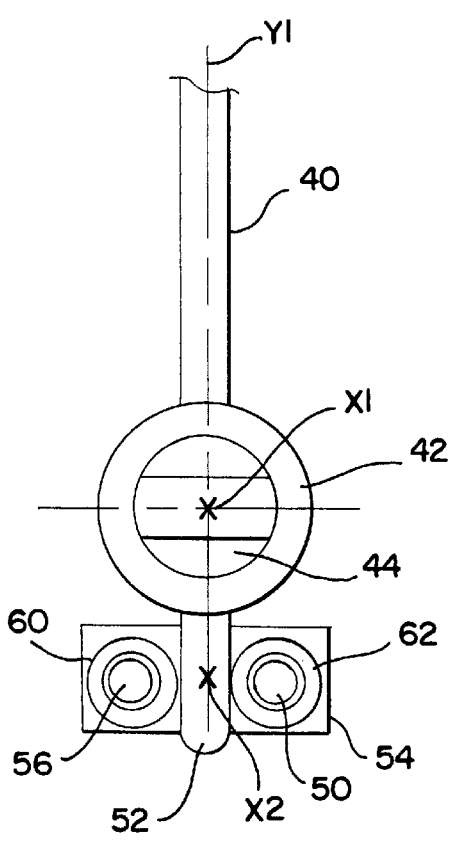
FIGS. 2A and 2B are, respectively, an end view and top view showing the relation between the steering lever and the bearing block when the steering lever is in the neutral or centered position.

Turning to the figures of the drawings, there is seen in FIG. 1 an exploded view of a preferred embodiment of a steering assembly, generally indicated by 10, in accordance with the present invention. The steering assembly 10 provides for changing the direction of a wheel (not shown), the wheel being mounted to the assembly 10 by means of a conventional wheel hub 12 secured to a spindle 14 by means of a locknut 16 received on the threaded end of the spindle 14. As is well known in the art, the spindle 14 includes two sets of ballbearing rings 18 to provide for smooth rotation of the hub 12 about the spindle 14 with a minimum of frictional resistance.

The spindle 14 is carried by a clevis-like block 20 including a slot 22 and bore 24 that permit mounting of the block to a vehicle frame 26 for pivotal movement about an axis $Y_1$. As illustrated in FIG. 1, the vehicle frame 26 includes a machined flat section 28 that fits within the slot 22 of the clevis block 20. The flat section 28 includes a cross-hole 30 drilled therethrough that aligns with the bore 24 in the clevis block 20, the cross-hole 30 and bore 24 receiving a pivot pin 32 secured to the clevis block 20 by a lock nut 34 and lock washer 36 in the well known manner. Thus, clevis block 20, the spindle 14, and wheel hub 12 form an assemblage 38 that is mounted to the frame 26 so as to permit pivotal motion of the assemblage 38 about the $Y_1$ axis.

In keeping with the invention, the steering assembly 10 includes a steering lever 40 mounted to the frame 26 adjacent to the block-spindle-hub assemblage 38. The steering lever 40 is mounted to the frame 26 so as to be pivotable about an axis $X_1$ that is substantially perpendicular to the axis $Y_1$ about which the assemblage 38 rotates. To this end, the steering lever 40 is mounted to a rotatable, cylindrical collar 42 that is received on a precisely-machined cylindrical portion 44 of the frame 26. As illustrated, the cylindrical collar 42 is captured between a shoulder 46 on the frame 26 at one end of the cylindrical portion 44 and a snap ring 48 received in a groove 50 at the other end of the cylindrical portion 44.

The cylindrical collar 42 also supports a drive pin 52 that extends therefrom. As illustrated, the steering lever 40 and the drive pin 52 extend from opposite sides of the collar 42. However, the steering lever 40 and drive pin 52 could be mounted to the collar 42 so that an angle is formed therebetween.

The drive pin 52 is operatively connected to the spindle-hub-block assemblage 38 so that when the collar 42 is rotated about the $X_1$ axis by means of the steering lever 40, the drive pin 52 causes the assemblage 38 to pivot about the $Y_1$ axis to effect steering of the vehicle. To this end, a T-shaped bearing block 54 including a shaft portion 54a that is pivotably received in a precision-bored hole 55 in the clevis block 20 so as to be pivotable about a second axis $X_2$ that is also perpendicular to the $Y_1$ axis. The crossbar of the T-shaped bearing block 54 supports a pair of bearing studs 56, 58 that project from the bearing block 54 and are spaced so as to tightly capture and engage the drive pin 52 with a minimum of play. Each of the bearing studs 56, 58 supports a needle bearing or cylindrical roller 60, 62, respectively, that reduces the friction between the drive pin 52 and the bearing studs 56, 58 as the steering lever 40 is moved through its range of motion.

Figure 3A:
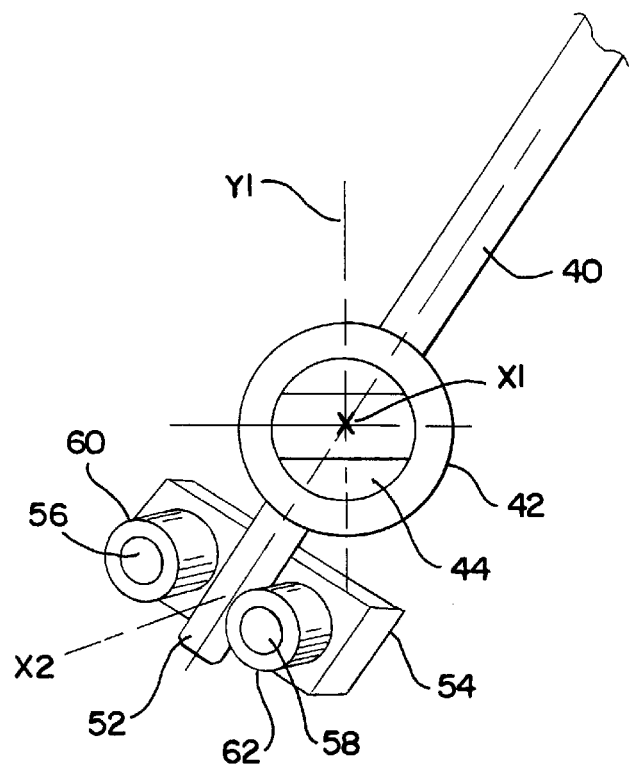
FIGS. 3A and 3B are, respectively, an end view and top view showing the relation between the steering lever and bearing block when the steering lever is in a position to make a right-hand turn.
Figure 2B:
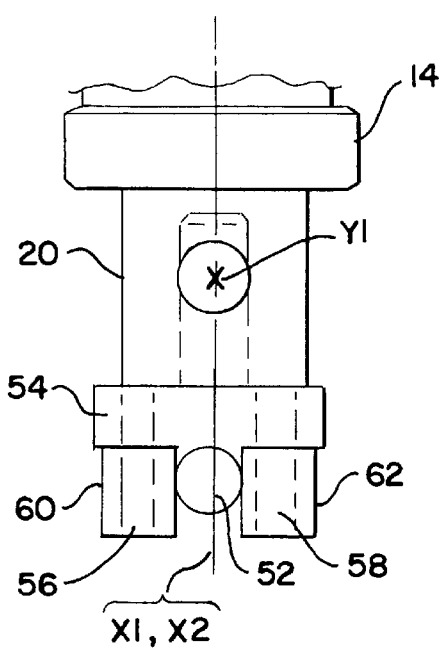
Figure 3B:
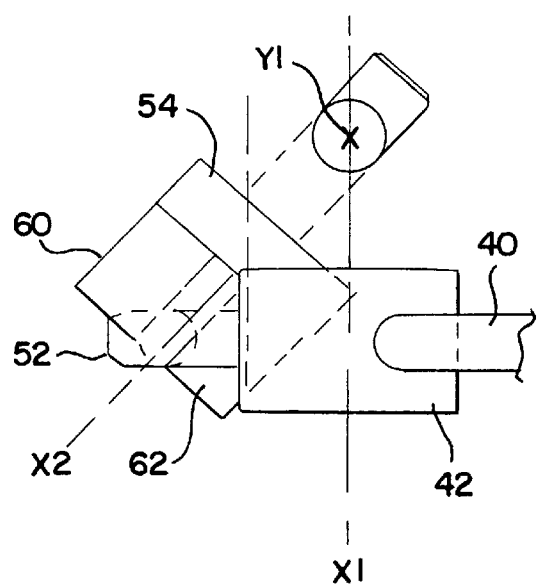

The manner in which the various components of the steering assembly cooperate in order to effect steering of the vehicle is best seen by reference to the remaining FIGS. 2–4 of the drawings. When it is desired that the vehicle travel in a straight line, the steering lever 40 is vertically positioned or centered so that the two axes, $X_1$ and $X_2$, are aligned and substantially coplaner (as shown in FIGS. 1, 2A, 2B, and 4A). To effect a right-hand turn, the steering lever 40, and consequently the drive pin 52, are rotated in a clockwise direction about the $X_1$ axis. With reference to FIGS. 3A, 3B and 4B, this causes the bearing block 54 to simultaneously rotate about both the $X_2$ and $Y_1$ axis, thus also rotating the spindle-hub-block assemblage 38 in a clockwise direction (when viewed from above) about the $Y_1$ axis. As can be appreciated, the design of the bearing block 54 is such that there is negligible play or lost motion between the steering lever 40, drive pin 52 and the block-spindle-hub assemblage 38. A left-hand turn is effected by moving the steering lever 40 in a counterclockwise direction about the $X_1$ axis, and the assemblage 38 in a counterclockwise direction about the $Y_1$ axis (as shown in FIG. 4C).

In accordance with another aspect of the invention, the steering assembly 10 has reduced sensitivity when in its neutral or centered position. With reference to FIGS. 2A, B, and 3A, B, when the steering lever 40 is centered, the distance between the center of rotation of the steering lever (i.e., the $X_1$) and the point of contact of the drive pin 52 with the needle bearings 60, 62 is the shortest. This distance increases as the steering lever 40 is moved from its centered position, thus causing greater rotation of the assemblage 38 about the $Y_1$ axis for each degree of movement of the steering lever 40 away from its centered position. This means that the steering sensitivity of the inventive assembly 10 decreases as the steering lever 40 moves toward its centered position.

In keeping with another aspect of the invention, the steering ratio (the relationship between the degree of rotation of the steering lever 40 about the $X_1$ axis to the degree of rotation of the assemblage 38 about the $Y_1$ axis) of the steering assembly 10 can be altered to accommodate the requirements of various different applications. Specifically, the steering ratio can be changed by varying the distance between the $X_1$ and the $X_2$ axes, or by varying the length of the steering lever 40.

In practical application, the steering assembly 10 may include additional features that enhance its operation and/or versatility. With reference to FIGS. 4A–C, the block 20 of the assemblage 38 may also support a brake, such as the caliper brake mechanism, generally designated 64. The brake 64 may be operated by a hand lever (not shown) and cable (also not shown) in the well-known manner. As illustrated, a guide 66 for a cable housing (also not shown) is mounted to the frame 26 in proximity to the brake mechanism 64.

In addition, if the vehicle on which the steering assembly 10 is to be used has a plurality of steerable wheels, means are provided for linking multiple block-spindle-hub assemblages 38 so that they can operate in unison. The other such assemblages would be mounted to the frame so as to be pivotable about axes parallel to and displaced from the $Y_1$ axis. To this end, the block 20 has an integral lever arm 68 that is connected by a tie-rod, or series of tie-rods (not shown), to similar lever arms on the other assemblages 38 on the vehicle. Optionally, steering levers and bearing blocks could be associated with the additional block-spindle-hub assemblages.

While the inventive steering mechanism has been described in the context of a recumbent, human-powered vehicle, the design may have utility in other types of vehicles for control of either a single wheel, or multiple wheels which may be linked together so as to be steered by a single steering lever. Also, while the invention has been described as having a steering lever, other means could be used to rotate the drive pin about the $X_1$ axis, e.g., a steering wheel and associated gear that rotates the rotatable, cylindrical collar 42. Further, while described in the context of a wheeled vehicle, the inventive steering assembly is equally applicable to vehicles having steerable skis, endless tracks, floats and the like.

What is claimed:

1. A steering assembly for use with a vehicle having a frame, the frame being supported by at least one directional support that is rotatable about a first axis to steer the vehicle, the steering assembly comprising:

a mounting member to which the directional support is secured, the mounting member being attached to the frame of the vehicle for pivotal motion about the first axis;

a steering lever mounted to the frame adjacent the mounting member, the steering lever being pivotable about a second axis perpendicular to the first axis and having a drive pin associated therewith;

a pivotable bearing block for operatively connecting the drive pin to the mounting member, the bearing block including a shaft that is received in the mounting member to permit rotation of the bearing block with respect to the mounting member about a third axis that is perpendicular to the first axis and laterally displaced from the second axis, and first and second studs that project from the bearing block so as to capture the drive pin therebetween;

whereby when the steering lever pivots about the second axis, the bearing block pivot in about the third axis and both the bearing block and mounting member pivot about the first axis to rotate the directional support, thus effecting steering of the vehicle.

2. A steering assembly for use with a vehicle having a frame, the frame being supported by at least one directional support that is rotatable about a first axis to steer the vehicle, the steering assembly comprising:

a mounting member to which the directional support is secured, the mounting member being attached to the frame of the vehicle for pivotal motion about the first axis;

a rotatable collar mounted to the frame adjacent the mounting member, the rotatable collar being pivotable about a second axis perpendicular to the first axis and having a drive pin associated therewith;

a pivotable bearing block for operatively connecting the drive pin to the mounting member, the bearing block including a shaft that is received in the mounting member to permit rotation of the bearing member with respect to the mounting block about a third axis that is perpendicular to the first axis and laterally displaced from the second axis, and first and second studs that project from the bearing block so as to capture the drive pin therebetween;

whereby when the rotatable collar pivots about the second axis, the bearing block pivots about the third axis and both the bearing block and mounting member pivot about the first axis to rotate the directional support, thus effecting steering of the vehicle.

3. The steering assembly of claim 1 or 2 wherein the first and second studs of the bearing block support bearings that engage the drive pin.

4. The steering assembly of claim 1 or 2 wherein the directional support comprises a wheel.

5. The steering assembly of claim 1 or 2 wherein the directional support comprises a ski.

6. The steering assembly of claim 1 or 2 wherein the directional support comprises an endless flexible track.

* * * * *